US005825504A

United States Patent [19]

[11] Patent Number: 5,825,504

[45] Date of Patent: Oct. 20, 1998

Broddin et al.

[54] METHOD FOR STABLE ELECTRO (STATO) GRAPHIC REPRODUCTION OF A CONTINUOUS TONE IMAGE

[75] Inventors: Dirk Broddin, Edegem; Serge Tavernier, Lint, both of Belgium

[73] Assignee: AGFA Gevaert, Mortsel, Belgium

[21] Appl. No.: 724,065

[22] Filed: Sep. 30, 1996

Related U.S. Application Data

[60] Provisional application No. 60/008,593, Dec. 13, 1995.

[30] Foreign Application Priority Data

Oct. 13, 1995 [EP] European Pat. Off. .............. 95202768

[51] Int. Cl.[6] ........................................ H04N 1/23

[52] U.S. Cl. ........................ 358/300; 358/298; 347/254

[58] Field of Search ........................ 399/231; 347/251, 347/254, 240, 131; 358/298, 300

[56] References Cited

U.S. PATENT DOCUMENTS

| | | | |
|---|---|---|---|
| 4,714,964 | 12/1987 | Sasaki | 358/298 |
| 4,725,867 | 2/1988 | Ng et al. | 355/4 |

*Primary Examiner*—Adolf Berhane
*Assistant Examiner*—Gregory J. Toatley, Jr.
*Attorney, Agent, or Firm*—Baker & Botts L.L.P.

[57] ABSTRACT

A method is provided for reproducing a continuous tone image by imagewise application of toner particles to a substrate comprising the following steps:

partitioning a surface of the substrate in a plurality of disjunctive microdots;

applying to at least one microdot at least two types of toner, having substantially the same chromaticity.

Preferentially, for each toner type a large majority of microdots within a region comprising adjacent microdots, is supplied with either a high or low amount of toner, whereas the other microdots are supplied with a medium amount of toner, and more preferentially for at least one toner type the region comprises at least one microdot supplied with a high, another with a low and another with a medium amount of said toner.

In a preferred embodiment the minimum number (N) of types of toner particles used in the method of this invention depends on the volume average size of the toner particles used.

18 Claims, 5 Drawing Sheets

METHOD FOR STABLE ELECTRO (STATO) GRAPHIC REPRODUCTION OF A CONTINUOUS TONE IMAGE

DESCRIPTION

This application claims the benefit of U.S. Provisional application Ser. No. 60/008,593 filed Dec. 13, 1995.

FIELD OF THE INVENTION

The invention relates a method for reproducing continuous tone images. In particular, but not exclusively to electro (stato)graphic methods for printing continuous tone images. The printing proceeds on opaque reflecting supports as well as on transparent supports.

BACKGROUND OF THE INVENTION

Well accepted printing methods in an "office-environment" as e.g. ink-jet printing and electrostatographic methods, are not used as much as would be expected when the convenience of these methods is considered. Most of these printing methods can only partially print continuous tone images and the continuous tone image has to be specially treated (e.g. by a dither method) before the print can be made. In this context, a continuous tone image or contone image is an image containing grey levels, with no perceptible quantisation to them. This drawback has hampered the use of these very convenient printing methods in those imaging areas where it is important to accurately print continuous tone images as e.g. in pictorial photography, medical imagery, etc.

In ink-jet printing, a convenient printing system for use in an office environment, it has been proposed in EP-A 606 022 to use different inks, with different pigmentation and to use the ink with low pigmentation to print the low densities and the ink with high pigmentation to print the high densities. In this technique use is made of ink drops with volumes ranging from 25 to 100 $\mu$l in the so called bubble jet based systems, or with volumes in the range of 5 to 10 $\mu$l in the so called continuous jet systems. In all cases the images are built up by combining in an appropriate way such drops on the substrate, and although the addressability of each drop typically lies in the range of 300 dpi (dots per inch, or dots per 25.4 mm) to 1200 dpi, the not fully reproducible way the dot spreads and penetrates in the substrate limits the real resolution in the printed image. Hereinafter the resolution of image will be described in dpi, a normal description in the printing business. 1 dpi (one dot per inch) equals 1 dot per 25.4 mm. Further attempts to reproduce continuous tone images using light- and dark-coloured inks have been described in EP-A-0 606 022 and U.S. Pat. No. 4,860,026.

Electro(stato)graphic methods are evenly well accepted imaging methods in an "office environment" as ink-jet printing since these methods, e.g. electrophotographic copiers, electrographic printers, Direct Electrostatic Printing (DEP), are convenient, fast, clean and do not need aqueous solutions. Since electro(stato)graphic methods may use solid particles that typically have a particle diameter between 1 and 10 $\mu$m as marking particle, it is possible to achieve very high resolution in electro(stato)graphy.

However, most electro(stato)graphical imaging systems, are not intrinsically capable of forming continuous tone and special measures have to be taken to print continuous tone images.

Continuous tone printing in electrophotographic printing by a laser beam is described in the Journal of Imaging Technol., Volume 12, n° 6 December 1986 on pages 329 to 333 in an article entitled "Electrophotographic Color Printing Using Elliptical Laser Beam Scanning Method". In this article a dot matrix method, combined with pulse-width modulation of the laser beam (to be able to introduce in each dot of the matrix several density levels) and with an elliptical laser beam, is described to achieve a continuous tone reproduction with sufficient resolution and linearity over a tone range of 256 levels. Although with such a printing system quality continuous tone prints can be made, there are still some problems to be addressed. On an electrostatic photoreceptor there is a threshold level of toner adhesion: this means that in the low density areas, where the electrostatic latent image is weak and is situated just above that threshold, the system shows inherently some instability in the low density areas. Also, since the low density areas are printed using very few toner particles, the granularity (in other terms graininess or noise) in the low density areas becomes easily objectionable for high quality prints.

In Patent Abstract of Japan vol. 007 no. 290 (p. 245), 24 Dec., 1983 & JP-A-58 162970 (Hitachi Seisakusho KK), 27 Sep., 1983 a second toner having a same colour and a lower colour density (1.0 black density) is added to a first toner (1.8 black density) in a 4:1 ratio to obtain a good gradation.

In U.S. Pat. No. 5,142,337 a second toner is used, comprising a mixture of opaque black, opaque white and clear toner. A second toner layer is applied on top of a first toner layer, comprising black toner.

In proceedings of the International Congress on Advances in Non-Impact Printing Technologies, San Diego, Nov. 12–17, 1985, no. Congress 5, 12 Nov., 1989, Moore J., pages 331–341, Kunio Yamada et al 'Improvement of halftone dot reproducibility in laser-xerography', the author discusses graininess of the xerographic process, mainly influenced by dot growth.

In EP-A-0 275 636 a cyan, magenta, yellow and black toner combination is disclosed for colour printing applications.

In Journal of Imaging Technology, vol. 15, no. 5, Oct. 10, 1989, pages 198–202, Tanaka T 'Color Reproduction in Electrophotography: a layered model', Tanaka discloses a method predicting colour from colour-toner weight and vice versa.

The intrinsic qualities of electro(stato)graphic printing methods (speed, resolution, cleanness, dry operationable) have not yet been used in instances where speed, cleanness and dry operationability are highly wanted, just because of the problems cited above. A particular, but not limiting, example of an area where electro(stato)graphic printing could advantageously be used, if good, stable, high resolution half-tone (continuous tone) printing over at least 256 printed (not only addressed) density levels were possible, is the medical hard-copy sector.

There is thus need for electro(stato)graphic methods being capable of printing continuous tone images.

OBJECTS OF THE INVENTION.

It is an object of the present invention to provide a method and apparatus suitable for stable and reliable generation of large amounts of tone values.

It is an other object of the invention to provide a method for electro(stato)graphic printing making it possible to print at least 256 monochrome or colour density levels in a stable way.

It is a further object of the invention to provide a method for electro(stato)graphic printing making it possible to print continuous tone images with reduced noise.

It is still another object of the invention to provide a method for electro(stato)graphic printing making it possible to print in a rapid, clean, dry and stable way high resolution continuous tone images.

It is a further object of the invention to provide a method for electro(stato),graphically printing images obtained during medical diagnosis.

Other objects and advantages of the present invention will become clear from the detailed description hereinafter.

SUMMARY OF THE INVENTION

The above mentioned objects are realised by the specific features according to claim 1. Preferred embodiments of the invention are disclosed in the dependent claims. At least two toner types, having substantially the same chromaticity, are used. Chromaticity describes objectively hue and saturation of a colour, and may be measured in terms of CIE x,y or u',v' (cfr. "The reproduction of colour in photography, printing & television" by R. W. G. Hunt, 4th edition 1987, ISBN 0 86343 088 0, pp. 71–72). The term "substantially the same" means that, as expressed in the approximately uniform CIE L*a*b* colour space, the following holds:

$$\sqrt{(\Delta a^*)^2 + (\Delta b^*)^2} \leqq 20$$

Because the chromaticity of toner particles, fused to a substrate, may be different from that of the original toner particles, the chromaticity referred to is that of the toner particles appearing on the final substrate. Those two toner types may be identical, but preferentially the colouring power of each toner type is different. In a preferred embodiment, each toner type is applied in a subsequent toning step, e.g. by a different toner station. In a preferred embodiment, the different colouring power is obtained by a different degree of pigmentation. In one embodiment, at least two achromatic toners are used, i.e. greyish or black toners of which the chromaticity is substantially zero.

In a preferred embodiment, cells are printed by applying a number (N) of different types of toner particles, said toner particles having an average volume diameter $d_{v50}$, and wherein said number N fulfils the relation $N \geqq 0.3 \times d_{v50}$ and wherein N is determined by adding 0.5 to $0.3 \times d_{v50}$ and rounding to the next lower integer.

In a further preferred embodiment $N \geqq 0.4 \times d_{v50}$ and N is determined by adding 0.5 to $0.4 \times d_{v50}$ and rounding to the next lower integer.

DETAILED DESCRIPTION OF THE INVENTION.

The invention is described hereinafter by way of examples with: reference to the accompanying figures wherein FIG. 1 shows an amount or toner concentration $C^1$ of a first toner as a function of the required optical density $D_0$ on a substrate along with a toner concentration $C^2$ of a second toner, as a function of the same required optical density $D_0$, according to a specific embodiment for carrying out the method according to the current invention.

Figure 1:
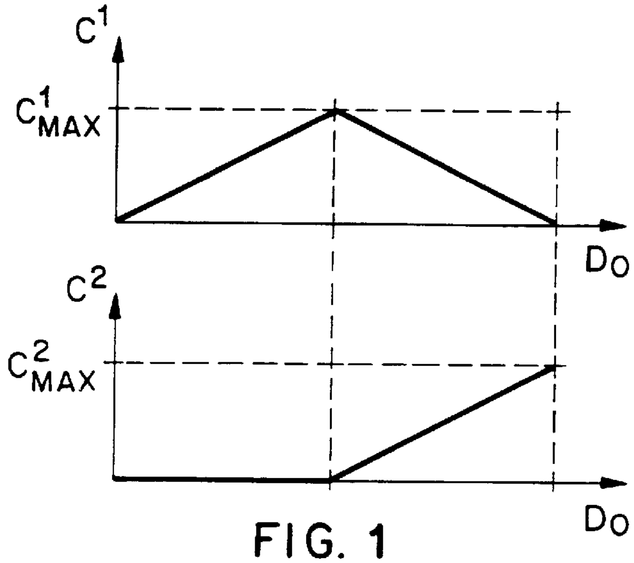

While the present invention will hereinafter be described in connection with preferred embodiments thereof, it will be understood that it is not intended to limit the invention to those embodiments. On the contrary, it is intended to cover all alternatives, modifications, and equivalents as may be included within the spirit and scope of the invention as defined by the appending claims.

This application is concerned whit any printing method wherein an image is formed by the deposition of particulate marking species. In particular this application is concerned with two electro(stato)graphic printing methods. One is the classical electrography where an electrostatic latent image, on a latent image bearing member, is developed by toner particles, whereafter the developed image can, but may not, be transferred to a final substrate. Another method is the method of Direct Electrostatic Printing (DEP), wherein toner particles are imagewise deposited on a substrate without the use of an electrostatic latent image.

By the method according to the current invention, a monochrome image or a colour image may be reproduced. A monochrome image may be referred to as a black and white image, with continuous tone grey levels. The monochrome image may also be obtained by capturing a colour image by only one spectral band, such that a digital image is obtained for which each picture element or pixel can have one value, corresponding to a specific tone level. Also colour separations, giving a yellow, magenta, cyan and black image of a continuous tone colour image are, in the present invention also designated by monochrome image. A colour image may be obtained by superposition of different colour separations. In a preferred embodiment, the traditional colour components cyan, magenta and yellow, are augmented with at least one extra colour component according to one toner type. This extra colour component may have another density or colouring power of either cyan, magenta or yellow. In another embodiment, a traditional black component is added to the three usual colour components and a grey component is added to vary the black and grey components according to the method of the current invention. In another embodiment, for each traditional colour component, CMY or CMYK, at least a second colour component, having a lower pigmentation level, C'M'Y' (K') is added.

Usually the number of tone levels per colour component is chosen to be 256, and the pixel values vary from 0 to 255 accordingly.

An electrographic device (electrostatographic, electrophotographic, etc.) can address different locations on the substrate in order to supply to each location a specific amount of toner. At each such location, a dot of toner particles may be deposited by the electrographic device. Because such location constitutes the smallest dot that can be addressed and deposited by the electrostatic device, such location is called a microdot. The whole substrate can now be partitioned in a plurality of adjacent, non-overlapping or disjunctive microdots. Usually the shape of each microdot is square. In typical electeographic devices, 300 up to 600 microdots may be arranged side by side on one inch (25.4 mm), in which case the "resolution" of the device is said to be 300, respectively 600, dots per inch (dpi). Microdots may also have a rectangular shape, and/or may be arranged on the substrate in oblique directions rather than in two orthogonal directions. Microdots may also have a hexagonal shape and an appropriate arrangement in order to fill up the complete substrate. By addressing the marking engine of the output device, a specific amount of toner particles is deposited for one microdot. Preferentially the toner particles are deposited within the boundaries of the microdot. Usually the toner particles are deposited according to a Gaussian distribution, having its centre close to the centre of the microdot. It is possible that toner particles, intended for a specific microdot, partially or fully fall within a neighbouring microdot. Although the microdots are disjunctive from each other, it is possible that toner particles of adjacent microdots are not disjunctive.

In a preferred embodiment according to the current invention, the electrographic device may supply at least three different amounts of one toner to each microdot. By the amount of toner is meant the concentration or toner deposition level, which may be expressed in milligram toner per square centimetre [$mg/cm^2$]. A different concentration may be obtained by pulse width modulation of an electronic signal e.g. when monitoring the exposure of a photosensitive semiconductor drum by a laser beam; or by pulse height or amplitude modulation; or any other measure in order to modulate the concentration within or attributable to one microdot. A microdot may get no toner at all or a "low amount" of toner, which means that the toner concentration, measured by the amount of toner deposited for that microdot and related to the area of that microdot, is less than 10% of the maximum toner concentration (e.g. 10 $mg/cm^2$); a microdot may get a "high amount" of toner, which means that the toner concentration within such microdot is higher than 70% of the maximum toner concentration for the current application; a microdot may get also a "medium amount" of toner, which means that the toner concentration is between 10% and 70% of the maximum toner concentration. Preferentially, apart from these three toner concentrations, more toner concentrations may be available. In a preferred embodiment, sixteen levels of toner concentration for each microdot and for each toner type are established.

Because of the restricted contone capabilities of the electrographic device, i.e. only sixteen different optical density levels achievable per microdot, a process of halftoning is applied to the contone images. Because each microdot can get more than two toner concentrations in the halftone scheme, this type of halftoning is called multilevel halftoning. Two major types of multilevel halftoning exist: halftone dot size modulation and frequency modulation. For halftone dot size modulation, halftone dots, comprising a plurality of microdots, are laid out on a periodic grid having a screen ruling and a screen angle. In order to achieve a higher optical density, more microdots carrying toner are added to the halftone dot. This corresponds with an autotypical raster in traditional binary screening techniques. In frequency modulation, halftone dots are created from a fixed number of microdots, maybe just one microdot, and the distance between such halftone dots is varied, rather than their size. For both techniques, adjacent microdots are preferentially, but not necessarily, arranged in cells, called halftone cells for autotypical screening techniques. By the term adjacent is meant that microdots touch each other by one side or by a corner. Also for frequency modulation techniques, a plurality of microdots may be arranged in one cell. Each cell comprises preferentially the same number of microdots, has the same shape and the cells are arranged such that the whole substrate may be tiled by adjacent cells.

According to a specific embodiment of the current invention, some tone levels of the original image are reproduced by applying two different toners, having substantially the same chromaticity, or more specifically two achromatic toners, to one cell. An achromatic toner is a greyish or black toner. If a low density must be realised within a cell on the substrate, just one toner may be applied to the cell. A higher optical density within that cell, may be realised by applying a large amount of greyish toner and a low amount of black toner to the cell. It is important to select the distribution of each toner type over the cell such, that the stability of the electrographic process is not jeopardized. It has been found that toner application to microdots is most stable, predictable and reproducible if either a low amount or a large amount is supplied to the microdot. In order to exploit the multilevel capabilities of the electrographic device, at least one microdot within a cell or region, comprising adjacent microdots, must have the possibility to get a medium amount of toner. Typically, for a cell consisting of four microdots, arranged in a 2×2 fashion, three microdots, i.e. a large majority of microdots, preferentially get a "stable amount" of toner, i.e. they may get no or a minimum amount of toner or a maximum amount of toner. The other microdots, being a minority, in this example just one microdot, may be supplied with a medium amount of toner. Where frequency modulation techniques are used, a cell may comprise as much as 256×256 microdots. By a large majority is meant 66% or more. In a preferred embodiment, a large majority (≧66%) of microdots within a region is supplied with either a high or low amount of one toner, whereas the other microdots (a minority) are supplied with a medium amount of said toner. In other words: only a minority of microdots (i.e. no microdots or any number ≦34%) within a region or cell is supplied with a medium amount of toner.

Implementations of frequency modulation, which are designed for speed, are tile-based, where the tiles correspond to periodic cells of typically a few hundred by a few hundred microdots. Implementations which are not tile based are generally based on some variant of an error-diffusion algorithm. Where frequency modulation techniques are used, a cell may comprise 256×256 microdots or there may be no cell at all if an error diffusion algorithm is used. In these cases it makes sense to replace the notion of cell by a local environment or "region" of a particular microdot. The extent of the environment is to be chosen such that several halftone dots are within the environment. For such an environment one can determine the number of microdots which get a stable amount of toner. For binary error diffusion variants all the microdots get a 'stable' amount of toner. Alternatively, a hybrid error diffusion technique may be used, based on cell level, instead of based on microdot level, wherein each multilevel halftone cell comprises a plurality of adjacent microdots.

When several types of toner particles are applied to one cell, it is possible that a microdot gets a low, medium or high amount of the first type of toner, whereas the same microdot may get also a low, medium or high amount of the second toner type. It is important that per toner type a large majority of microdots within a cell gets either a high or low amount of that specific toner. Examples below will show that one microdot within a cell may get a medium amount of first toner, while another microdot within the same cell may get a medium amount of second toner.

In U.S. Pat. No. 4,714,964 a system is described for multi-level halftoning, making use of two different inks. As may be noticed from grey levels 4 and 12 in FIG. 1 and grey levels 4 and 8 in U.S. Pat. No. 4,714,964, a large majority of medium amounts of ink may be imaged, which gives unstable and unpredictable tone levels with most multilevel electrographic devices. This problem is solved according to the current invention by imposing to the printing process that a large majority of the microdots within a cell must have either a low or a high amount of toner. Whereas intermediate tone levels or optical density levels must be achieved within a specific cell, at least one microdot within that cell preferentially has a low amount of toner, at least one microdot has a high amount of toner and, in order to achieve fine tone gradations, at least one microdot has a medium amount of toner. According to U.S. Pat. No. 4,714,964 either a low-concentration or a high-concentration ink is deposited on one microdot. We have found that the perceived noise level of the reproduced image may be substantially improved by printing at least two toner types having substantially the same chromaticity on top of each other within one microdot for specific density levels.

The reproducing or printing method, according to the present invention, can be practised both with liquid electrostatographic development (using a dispersion of solid toner particles in a dielectric liquid) and with dry electrostatographic developers. The dry developers can be mono-component developers (comprising toner particles, but no carrier particles) as well as multi-component developers (comprising toner and carrier particles).

It was found, using developers that comprise toner particles with an average volume diameter in the micrometer range, that the minimum number (N) of types of toner particles depended on the volume average size (in $\mu$m) of the toner particles used. When toner compositions are used comprising toner particles having different volume average diameter ($d_{v50}$ in $\mu$m) the number (N) of types of toner needed for good printing depends on the largest $d_{v50}$ used in printing.

It was found that the number N should at least be equal to $0.3 \times d_{v50}$, wherein N is determined by adding 0.5 to $0.3 \times d_{v50}$ and rounding to the next lower integer. In this case, when using toner compositions comprising toner particles with a particle size distribution wherein $5\ \mu m \leqq dv50 \leqq 8\ \mu m$, N is at least 2.

It is however preferred to use N toning steps, where N is at least equal to $0.4 \times d_{v50}$, wherein N is determined by adding 0.5 to $0.4 \times d_{v50}$ and rounding to the next lower integer. In this case, when using toner composition comprising toner particles with a particle size distribution wherein $7\ \mu m \leqq dv50 \leqq 8\ \mu m$, N is at least 3.

The toner compositions of the number N types of toner particles, preferably differ in degree of colouring power (i.e. the density achievable in the final image). The colouring power of the type of toner having the lowest colouring power ($T_1$) is, for a given amount of deposited toner, preferably such that $T_1$ gives, between 10 and 50% of the density given by the toner particles having the highest colouring power ($T_{max}$), when the same amount of particles (expressed in mg/cm$^2$) is deposited. In a more preferred embodiment said toner composition $T_1$, not only has the lowest degree of colouring power, but comprises also toner particles having a particle size distribution showing the lowest volume average diameter. In relative terms the toner particles comprised in toner composition $T_1$ have a $d_{v50}$ that is at least 1.5 to 2.5 times smaller than the $d_{v50}$ of the toner particles comprised in the toner having the highest colouring power ($T_{max}$).

The colouring power of the toner particles comprised in the various toner compositions is chosen such that in the final image between 0.1 and 2 mg/cm$^2$ of toner is present.

When the original image to be printed, according to the present invention, on the opaque reflecting substrate is an image of a medical diagnostic apparatus, it is possible that the dynamic range of the original exceeds the dynamic range of the recording medium, since the $R_{min}$ achievable on an opaque reflecting substrate is around 0.01, amounting to a maximum density around 2.00. Thus the difference between the highest and lowest reflectance is around a factor 100, whereas an original medical image can have a difference in intensities around 1000. Therefore it may be beneficial to divide the dynamic range of the original into several portions each of these portion not having a dynamic range exceeding the dynamic range of the recording medium. A way of doing so has been described in EP-A-0 679 015, that is incorporated herein by reference.

The opaque reflecting support used in the present invention can be paper, polyethylene coated paper, an opaque polymeric reflecting substrate, etc. Opaque reflecting polymeric substrates, useful as a final substrate to be used according to this invention, are e.g. polyethyleneterephthalate films comprising a white pigment, as described in e.g. U.S. Pat. No. 4,780,402, EP-B 182 253. Preferred however are polyethyleneterephthalate films comprising discrete particles of a homopolymer or copolymer of ethylene or propylene as described in e.g. U.S. Pat. No. 4,187,113. Most preferred are opaque reflecting final substrates comprising a multi-ply film wherein one layer of said multi-ply film is a polyethyleneterephthalate film comprising discrete particles of a homopolymer or copolymer of ethylene or propylene and at least one other layer is a polyethyleneterephthalate film comprising a white pigment as described in e.g. EP-A-0 582 750 and Japanese non-examined application JN 63/200147.

Especially when the opaque reflecting final substrate is either polyethylene coated paper or an opaque reflecting polymeric substrate, it has proven beneficial to coat a toner receiving layer onto said substrate. This toner receiving layer comprises a binding agent or mixture of binding agents. As binding agent (binder) preferably thermoplastic water insoluble resins are used wherein the ingredients can be dispersed homogeneously or form therewith a solid-state solution. For that purpose all kinds of natural, modified natural or synthetic resins may be used, e.g. cellulose derivatives such as ethylcellulose, cellulose esters, carboxymethylcellulose, starch ethers, polymers derived from $\alpha$, $\beta$-ethylenically unsaturated compounds such as styrene, polyvinyl chloride, after-chlorinated polyvinyl chloride, copolymers of vinyl chloride and vinylidene chloride, copolymers of vinyl chloride and vinyl acetate, polyvinyl acetate and partially hydrolysed polyvinyl acetate, polyvinyl alcohol, polyvinyl acetals, e.g. polyvinyl butyral, copolymers of acrylonitrile and acrylamide, polyacrylic acid esters, polymethacrylic acid esters and polyethylene or mixtures thereof. A particularly suitable ecologically interesting (halogen-free) binder is polyvinyl butyral. Polyvinyl butyral containing some vinyl alcohol units is marketed under the trade name BUTVAR B79 of Monsanto USA.

The printing of a continuous tone image on a transparent substrate proceeds basically as described above for the printing of a continuous tone image on an opaque reflecting support. The transparent supports can be made of glass or of a polymeric resin. The polymeric resin substrate can be a polyester, e.g. polyethyleneterephthalate, polyethylenenaphthalate, polycarbonates, polyolefinic film, etc. The final substrate (either transparent or opaque), whereon the printing, according to the method of the present invention proceeds, can be present as sheet or as web material.

When the continuous tone image is printed on a transparent support, be it by a DEP process or by classical (regular) electro(stato)graphy, the obtainable maximum transmission density is around 2.00. This is due to the definite size of the toner particles, the limited amount of pigment that can be incorporated in toner particles without negatively influencing the quality of the toner particles and to the finite amount of toner particles that can be deposited on the electrostatic latent image. The amount of toner particles that can be deposited in classical electro(photo) graphy is typically between 5 $g/m^2$ to 10 $g/m^2$, i.e. 0.5 to 1 $mg/cm^2$. This transmission density level is acceptable in e.g. transparencies for overhead projection, but is not satisfactory for e.g. medical images that are viewed on a light box. Even for prints made on reflecting supports, higher maximum densities are desirable. Moreover, when larger surfaces of maximum density are present, some micro-voiding exists. This micro-voiding (low density micro-spots within a surface of maximum density) deteriorates the quality of the print.

It has proven beneficial, even when printing on an opaque reflecting support, but especially when the printing of the original image proceeds on a transparent support, that at least the toner composition $T_N$ comprises one or more ingredients that together or in cooperation with ingredients comprised in the final substrate are capable of forming a light absorbing substance and said toner particles optionally comprise a light absorbing pigment or dye.

In a preferred embodiment said ingredients, comprised in said toner particles that together or in cooperation with ingredients comprised in said final substrate are capable of forming a light absorbing substance, are at least one reductant (compound A) and at least one substantially light insensitive silver salt (compound B).

In a further preferred embodiment said reductant (compound A) is incorporated in said toner particles and said substantially light insensitive silver salt (compound B) is incorporated in said final substrate.

In a further preferred embodiment the reaction between reductant (compound A) and substantially light insensitive silver salt (compound B) is aided by an auxiliary reductant C. In such a case there is a difference between the pigmentation of the toner type and the colouring power of the toner type. The pigmentation refers to the amount of pigments added to the toner during the fabrication process. The colouring power refers to the optical density in reflection or transmission obtained for a specific concentration [$mg/cm^2$] of the toner as applied and fused to the substrate, thus after reaction if any.

In a most preferred embodiment, said substantially light insensitive silver salt is a silver salt of a fatty acid, wherein the aliphatic carbon chain has preferably at least 12 C-atoms and said reductant is a di- or tri-hydroxy compound.

Substantially light insensitive organic silver salts suited for use according to the present invention are silver salts of aliphatic carboxylic acids known as fatty acids, wherein the aliphatic carbon chain has preferably at least 12 C-atoms, e.g. silver laurate, silver palmitate, silver stearate, silver hydroxystearate, silver oleate and silver behenate, and likewise silver dodecyl sulphonate described in U.S. Pat. No. 4,504,575 and silver di-(2-ethylhexyl)-sulfosuccinate described in published EP-A-0 227 141. It is most preferred to use silverbehenate in the method according to the present invention.

Well suited organic reducing agents for use in the reduction of said substantially light insensitive silver salts are catechol-type reducing agents, by which is meant reducing agents containing at least one benzene nucleus with two hydroxy groups (—OH) in ortho-position, e.g., catechol, 3-(3,4-dihydroxyphenyl) propionic acid, 1,2-dihydroxybezoic acid, methyl gallate, ethyl gallate, propyl gallate, tannic acid and 3,4-dihydroxy-benzoic acid esters. Preferred reductants are gallic acid or derivatives thereof.

The reductant to be used in an electrostatographic method according to the present invention, can in fact be a mixture of (a) primary, relatively strong reducing agent (compound A), as described above; and, (b) a less active auxiliary reducing agent (compound C) that form together a synergistic (superadditive) reducing mixture. As less active auxiliary reducing agents (compound C) preferably sterically hindered phenols are used.

It is possible that the light absorbing product formed by reaction of compounds A and B does not give a neutral black image tone in the higher densities nor a neutral grey image tone in the lower densities. Therefore toning agents (compound D), known from thermography or photothermography may be added in the process. Said toning agents can be incorporated in the toner particles or in the final image receiving substrate.

The transparent final substrate comprises a toner receiving layer coated on a transparent support. Said toner receiving layer comprises a binding agent or mixture of binding agents, that can be the same as those mentioned above. Since printing of high densities (D>2.00) is preferred, it is preferred that said toner receiving layer comprises also compounds A, B or C, or mixtures thereof and optionally toning agents (compound D). The toner receiving layer can also comprise waxes or "heat solvents" also called "thermal solvents" or "thermosolvents" improving the penetration of the reducing agent(s) and thereby the reaction speed of the redox-reaction at elevated temperature.

The transparent support is preferably a polymeric support. A wide variety of such supports are known and are commonly employed in the art. They include, for example, transparent supports as those used in the manufacture of photographic films including cellulose acetate propionate or cellulose acetate butyrate, polyesters such as poly (ethyleneterephthalate), poly(ethylenenaphthalate), polyamides, polycarbonates, polyimides, polyolefins, poly (vinylacetals), polyethers and polysulfonamides. Polyester film supports and especially poly(ethyleneterephthalate) and poly(ethylenenaphthalate) are preferred because of their excellent properties of dimensional stability. When printing medical images, it is preferred to use a blue coloured transparent film substrate, especially a blue dyed polyester support.

Toner compositions and substrates as described above have been disclosed in detail in EP 0 706 094, that, in its totality, is incorporated herein by reference.

The toner particles for use in a method for printing a continuous tone image on an opaque reflecting substrate as well as on a transparent substrate according to the present invention, can essentially be of any nature as well with respect to their composition, shape, size, and preparation method and the sign of their tribo-electrically acquired charge.

The toner particles used in accordance with the present invention may comprise any conventional resin binder. The binder resins used for producing toner particles according to the present invention may be addition polymers e.g. polystyrene or homologues, styrene/acrylic copolymers, styrene/methacrylate copolymers, styrene/acrylate/acrylonitrile copolymers or mixtures thereof. Addition polymers suitable for the use as a binder resin in the production of toner particles according to the present invention are disclosed e.g. in BE 61.855/70, DE 2,352,604, DE 2,506,086, U.S. Pat. No. 3,740,334.

Also polycondensation polymers may be used in the production of toner particles according to the present invention. Polyesters prepared by reacting organic carboxylic acids (di- or tricarboxylic acids) with polyols (di- or triol) are the most preferred polycondensation polymers. The carboxylic acid may be e.g. maleic acid, fumaric acid, phthalic acid, isophthalic acid, terephthalic acid, trimellitic acid, etc or mixtures thereof. The polyolcomponent may be ethyleneglycol, diethylene glycol, polyethylene glycol, a bisphenol such as 2,2-bis(4-hydroxyphenyl)-propane called "bisphenol A" or an alkoxylated bisphenol, a trihydroxy alcohol, etc, or mixtures, thereof. Polyesters, suitable for use in the preparation of toner particles according to the present invention are disclosed in e.g. U.S. Pat. No. 3,590,000, U.S. Pat. No. 3,681,106, U.S. Pat. No. 4,525,445, U.S. Pat. No. 4,657,837, U.S. Pat. No. 5,153,301.

It is also possible to use a blend of addition polymers and polycondensation polymers in the preparation of toner particles according to the present invention as disclosed e.g. in U.S. Pat. No. 4,271,249.

In order to modify or improve the triboelectric chargeability in either negative or positive direction the toner particles may contain (a) charge control agent(s).

The toner powder particles useful in a method according to the present invention may be prepared by mixing the above defined binder resin(s) and ingredients (e.g. an inorganic filler, a charge controlling agent, optionally one of the compounds A, B or C, etc) in the melt phase, e.g. using a kneader. The kneaded mass has preferably a temperature in the range of 90° to 140° C., and more preferably in the range of 105° to 120° C. After cooling, the solidified mass is crushed, e.g. in a hammer mill and the obtained coarse particles further broken e.g. by a jet mill to obtain sufficiently small particles from which a desired fraction can be separated by sieving, wind classification, cyclone separation or other classifying techniques.

The toner particles useful according to the present invention may also be prepared by a "polymer suspension" process. In this process the toner resin (polymer) is dissolved in a water immiscible solvent with low boiling point and the toner ingredients (e.g. an inorganic filler, a charge controlling agent, at least one of the compounds A, B or C, etc) are dispersed in that solution. The resulting solution/dispersion is dispersed/suspended in an aqueous medium that contains a stabilizer. The organic solvent is evaporated and the resulting particles are dried. The evaporation of the solvent can proceed by increasing temperature, by vacuum evaporation, by spray-drying as described in, e.g. U.S. Pat. No. 3,166,510, U.S. Pat. No. 3,338,991, electrostatic pulverizing as described in, e.g. GB 2,121,203, etc.

The powder toner particles useful according to the present invention may be used as mono-component developer (magnetic as well as non-magnetic), i.e. in the absence of carrier particles but are preferably used in a two-component system comprising carrier particles.

When used in admixture with carrier particles, 2 to 10% by weight of toner particles is present in the whole developer composition. Proper mixing with the carrier particles may be obtained in a tumble mixer.

Suitable carrier particles for use in cascade or magnetic brush development are described e.g. in GB-P 1,438,110. For magnetic brush development the carrier particles may be on the basis of ferromagnetic material e.g. steel, nickel, iron beads, ferrites and the like or mixtures thereof. The ferromagnetic particles may be coated with a resinous envelope or are present in a resin binder mass as described e.g. in U.S. Pat. No. 4,600,675. The average particle size of the carrier particles is preferably in the range of 20 to 300 $\mu$m and more preferably in the range of 30 to 100 $\mu$m.

In a particularly interesting embodiment iron carrier beads of a diameter in the range of 50 to 200 $\mu$m coated with a thin skin of iron oxide are used. Carrier particles with spherical shape can be prepared according to a process described in United Kingdom Patent Specification 1,174,571. Carrier beads comprising a core and coated with a Si-containing resin are preferred for use according to the present invention. Such carrier beads have been described in e.g. U.S. Pat. No. 4,977,054; U.S. Pat. No. 4,927,728 and EP-A 650 099.

The printing, according to the present invention, can proceed in any electrostatographic printing device that incorporates several toning stations. Typical examples of useful printing device are colour printers having mostly 4 toning stations (one for yellow toner, one for magenta toner, one for cyan toner and one for black toner) wherein monochrome printing with the differently pigmented toners can proceed. As apparatus suitable for the implementation of the printing according to the present invention can be named CHROMAPRESS (trade name of Agfa-Gevaert NV Mortsel, Belgium).

An apparatus as CHROMAPRESS is very useful, while up to 10 toning stations are present. This opens the possibility for even better monochrome low density printing by using, at least for printing the image $I_1$, yellow, magenta and cyan toners with adapted pigmentation to produce grey tones.

EXAMPLES

Figure 2:
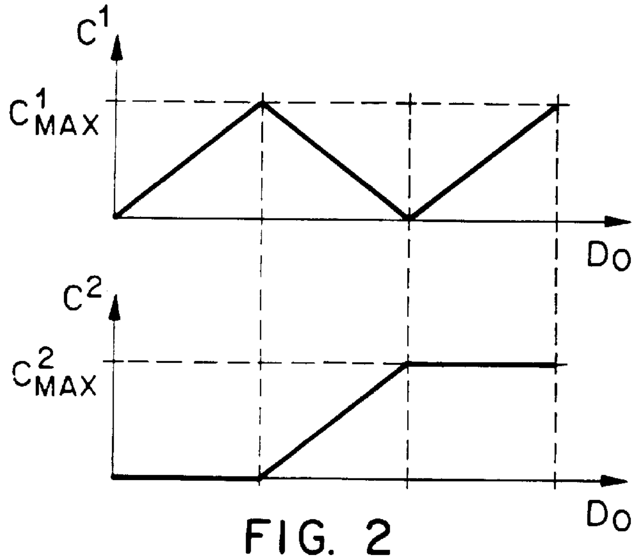
FIG. 2 shows the same variables as FIG. 1, with respect to another embodiment.
Figure 3:
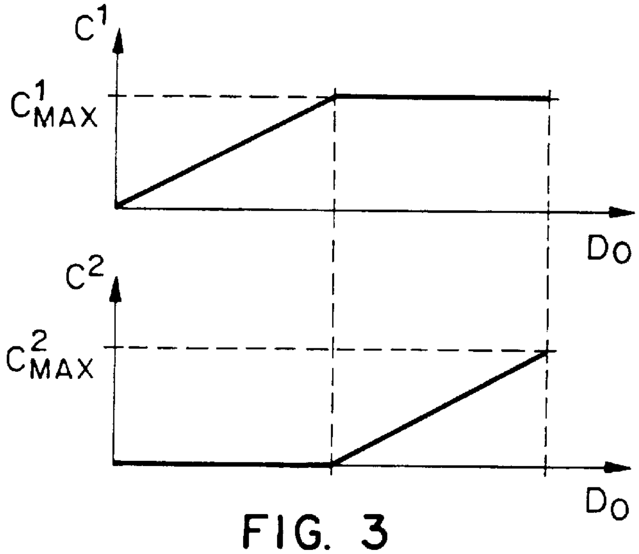
FIG. 3 shows the same variables as FIG. 1, with respect to yet another embodiment.
Figure 4:
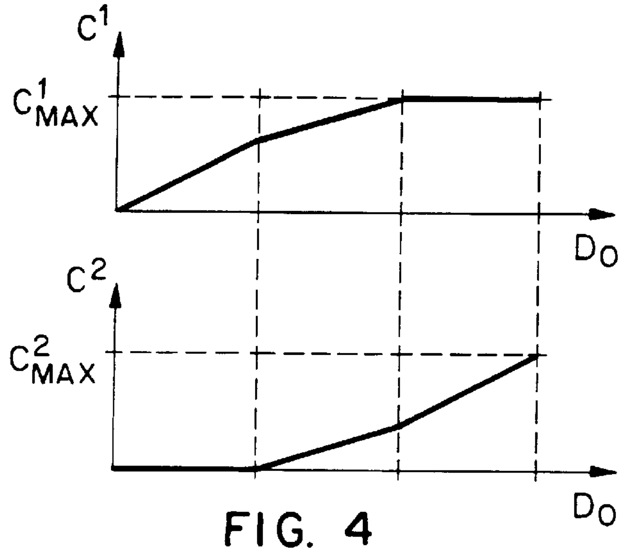
FIG. 4 shows the same variables as FIG. 1, with respect to still another embodiment.
Figure 5:
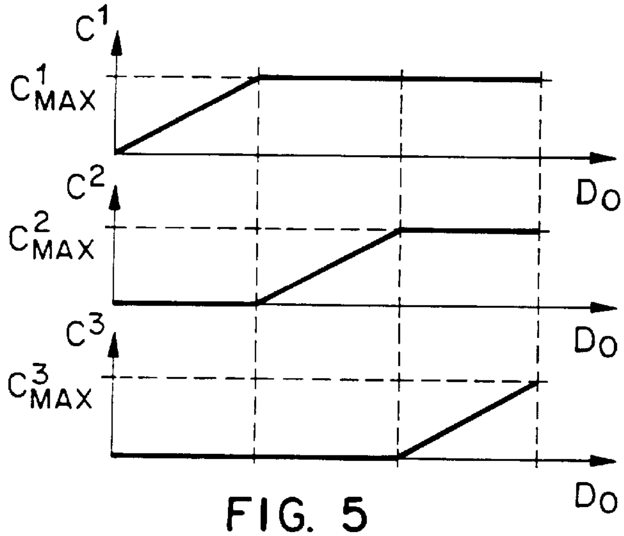
FIG. 5 shows the same variables as FIG. 1, with respect to another embodiment and involving three toners with concentration $C^1$, $C^2$ and $C^3$ respectively.
Figure 6:
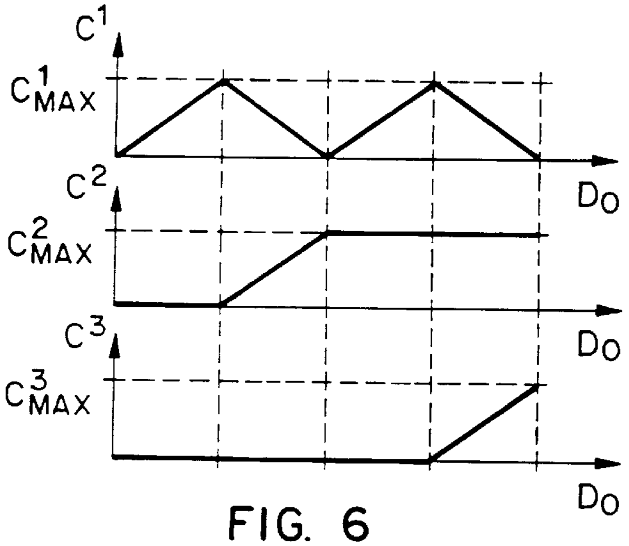
FIG. 6 shows the same variables as FIG. 5, with respect to another embodiment.

According to FIG. 3, in order to achieve a fine tone scale, indicated as $D_0$ in abscissa, the amount (e.g. $C^1$) of deposited toner of at least one toner composition is varied in a predefined, preferentially monotonous manner, as the optical density of the result $D_0$ increases. In order to save toner, it is also possible that the amount of deposited toner is not a monotonous function across the complete tone-scale. This is clarified by FIG. 1. Although the noise level may be reduced by superposition of several types of toner, it is beneficial to restrict the total amount of toner per microdot, preferably to 2 mg/cm$^2$. This is especially true if too high concentrations of toner particles tend to crack if the page or substrate is bent. Large toner concentrations may also cause inconvenient embossed type. FIGS. 2 and 4 show that other toner amounts as a function of the required optical density $D_0$ are achievable. Boundary points, where monotonicity is disrupted, are indicated by the vertical dashed lines in FIG. 1–4. It is within the scope of the present invention to select different values for the deposited toner mass or amount of toner $C^i$ of a particular toner composition i for the different boundary points, while some toner compositions can have arbitrary deposited mass and optionally change the rate of increase at some of the boundary points, as in the example of FIG. 4. In FIGS. 5–8 configurations are shown for use of three toners, preferentially at three different toner stations. In order to achieve a specific optical density $D_0$, the respective toner concentrations $C^1$, $C^2$ and $C^3$ may be found by using the three graphs in one of the figures. According to FIG. 5, toner concentrations are never descending. This option requires a serious total amount of toner, but has proven to be the most stable imaging method. According to FIG. 6, the toner amount of the first toner is ascending as a function of increasing density $D_0$ as long as the toner amounts for the second and third toners are constant. Whenever the toner amount for either the second or the third toner increases, the toner amount for the first toner decreases as a function of increasing density $D_0$.

Figure 7:
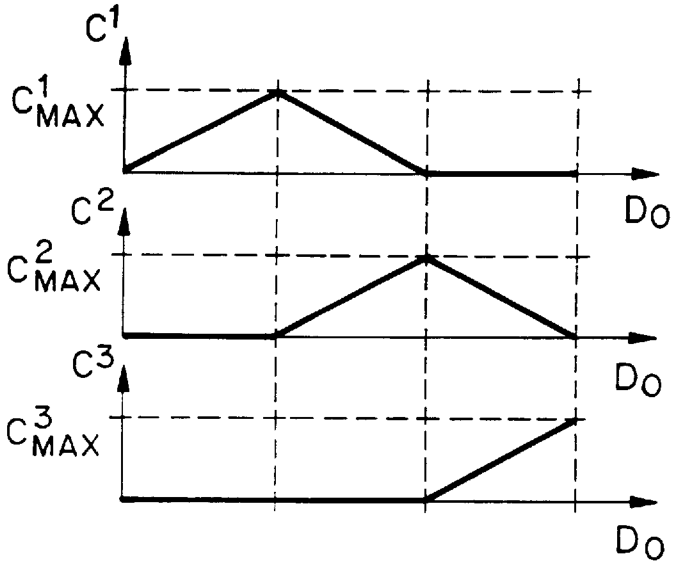
FIG. 7 shows the same variables as FIG. 5, with respect to yet another embodiment.
Figure 8:
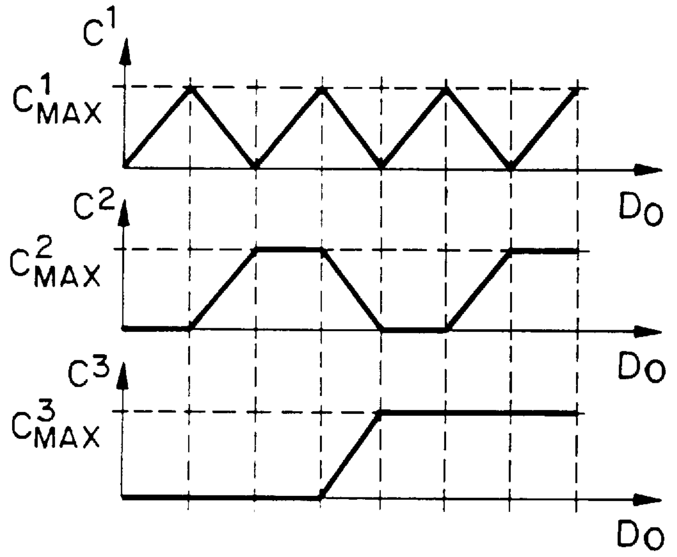
FIG. 8 shows the same variables as FIG. 5, with respect to still another embodiment.
Figure 9A:
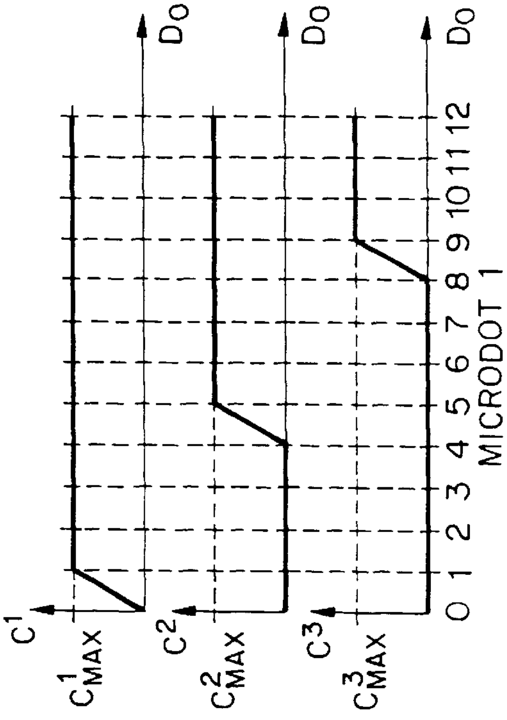
FIG. 9 shows the toner concentration of different microdots in a cell for 3 toners.
Figure 9B:
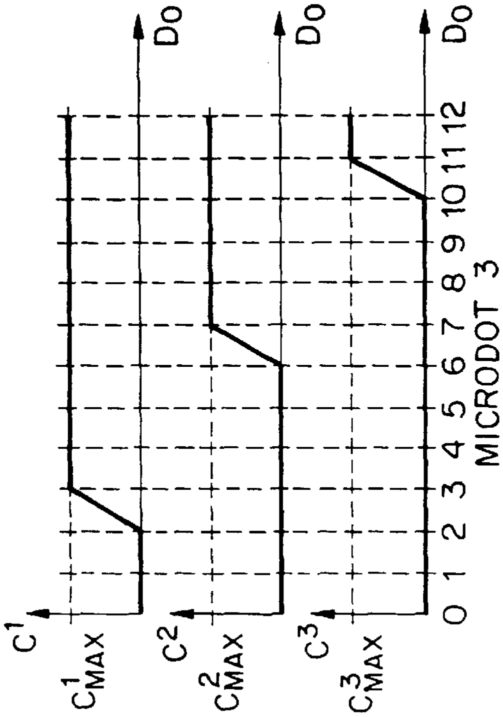
Figure 9C:
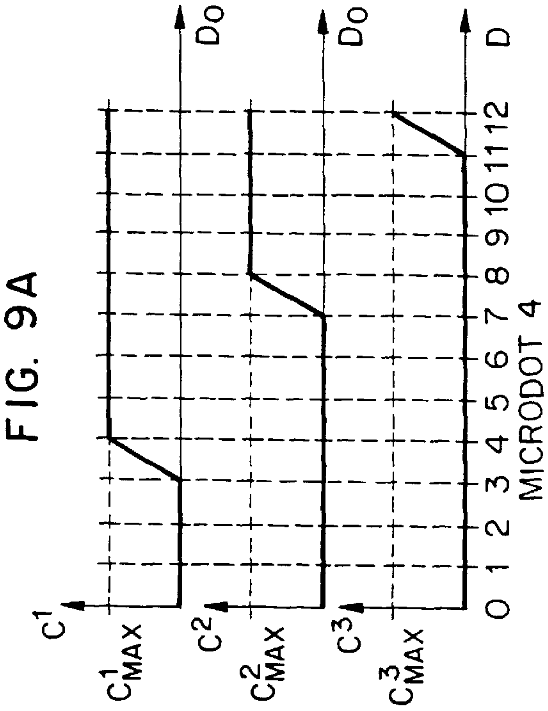
Figure 9D:
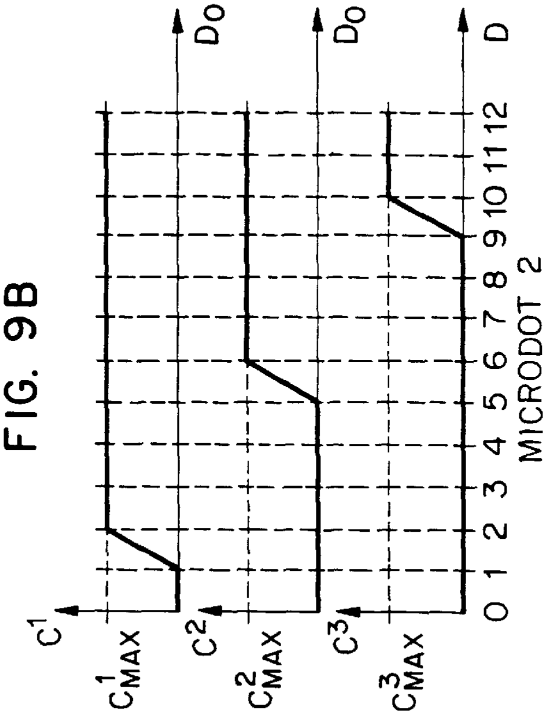
Figure 10A:
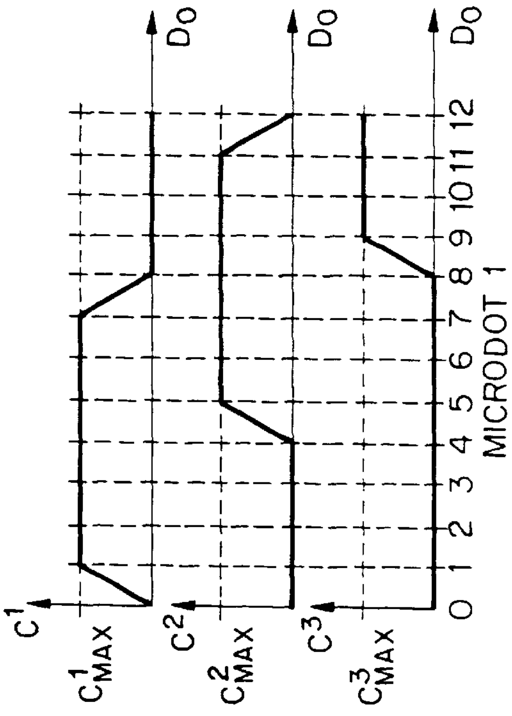
FIG. 10 shows the same variables as FIG. 9 in another embodiment of the present invention.
Figure 10B:
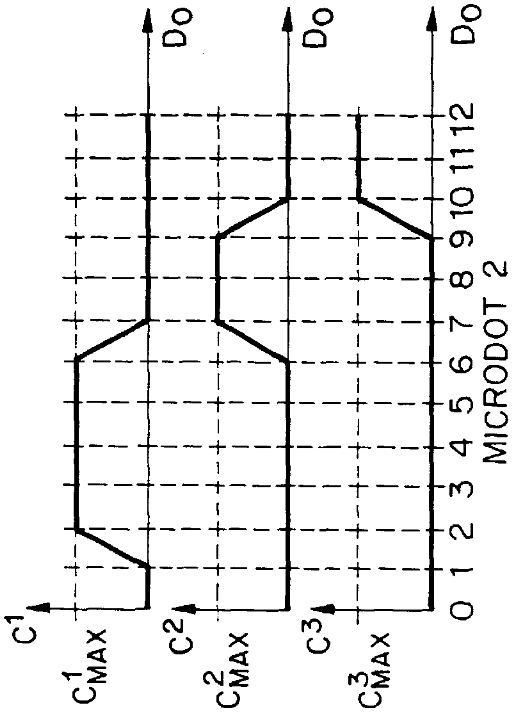
Figure 10C:
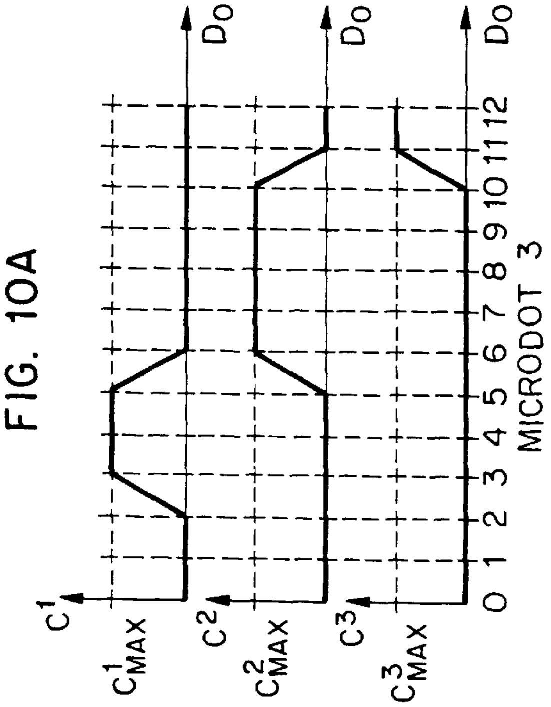
Figure 10D:
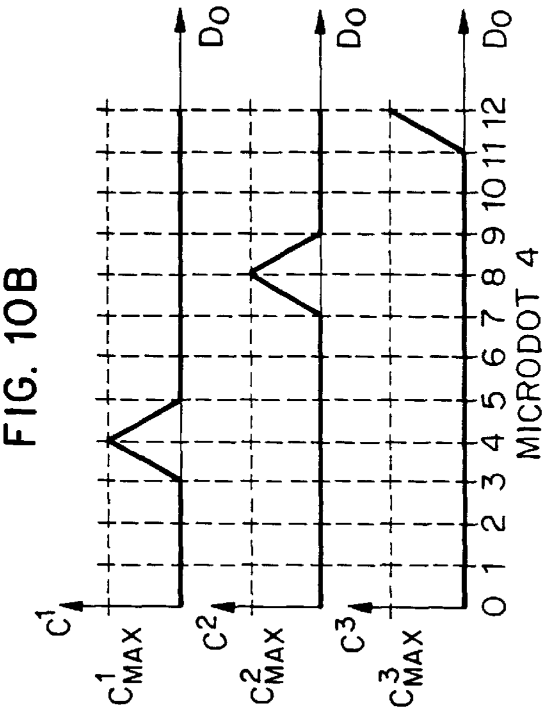

According to FIG. 7, which is more economic from the point of view of toner consumption, the total amount of toner is never larger than the largest amount of one toner. According to FIG. 8, all possible combinations of toner amount are exhausted. This allows for most optimal choice of possible toner concentrations.

From FIG. 1–8 it is thus clear that different portions of the tone scale $D_0$ may be printed with different combinations of layers, where some of the toner compositions may have a fixed deposited amount, some toner compositions or types of toner, having substantially the same chromaticity, may be absent, some toner compositions may have an increasing deposited toner amount, and some toner compositions—preferably having a lower pigmentation—may even decrease the deposited mass or toner amount, while the deposited mass of a higher pigmented toner composition increases as the tone $D_0$ to be printed increases.

PRINTING EXAMPLES

| PREPARATION OF THE TONER PARTICLES | |
|---|---|
| Polyester (ATLAC T500)* | 96 parts |
| Carbon Black ** | x parts |
| Tetrabutylammoniumbromide | 0.5 parts |

*ATLAC is a registered trade name of Atlas Chemical Industries Inc. Wilmington, Del. U.S.A.) and ATLAC T500 is a linear polyester of fumaric acid and propoxylated bisphenol A.
** CABOT REGAL 400 (trade names of Cabot Corp. High Street 125, Boston, U.S.A.).

Three toner compositions were prepared with varying concentration Carbon Black:

A: 0.20% of carbon black giving for 6 g/m$^2$ of fixed toner a minimal reflectance ($R_{min}$) of 0.61;

B: 0.45% of carbon black giving for 6 g/m$^2$ of fixed toner an $R_{min}$ of 0.38; and, C: 5% of carbon black giving for 6 g/m$^2$ of fixed toner an $R_{min}$ of 0.02.

The ingredients were melt kneaded at 110° C. for 30 min, after cooling, crushing and milling toner particles with a volume average particle size of 8.0 $\mu$m and a coefficient of variability ν=0.25 were obtained. 100 parts of these toner particles were mixed with 0.5 parts of $SiO_2$ (AEROSIL R972 tradename of Degussa Frankfurt/M—Germany.

CARRIER PARTICLES

A Cu—Zn ferrite based coated carrier was prepared by coating a Cu—Zn ferrite core with 1% of dimethylsilicone using a solution spraying technique in a fluidized bed and post curing the coating. The carrier showed a saturation magnetization ($M_{sat}$) of 0.41 Tesla.

The particle size distribution was characterized by:

$d_{v50\%}$=52.5 $\mu$m, $d_{v10\%}$=32 $\mu$m and $d_{v90\%}$=65 $\mu$m.

Three developers ($Dev_1$, $Dev_2$ and $Dev_3$) were prepared accordingly by adding 4% of the respective toner compositions $T_1$, $T_2$ and $T_3$ to the carrier particles. The toners had a charge of −3.7 Fc/10 $\mu$m.

PRINTING

The three developers were charged in the first three toner stations of an Agfa Chromapress printer. Chromapress is a trade name of Agfa-Gevaert N.V. in Mortsel Belgium. This printer has ten toner stations, five at each side of the substrate (paper) to be printed. In normal operation, four toner stations at each side are used, in order to overlay cyan, magenta, yellow and black toner, for reproducing colour images. This printer may print 1000 A3 size pages (297 mm×420 mm) per hour. The resolution is 600 dpi, such that the size of one microdot is about 42 $\mu$m. To each microdot and per toner station, 64 different energy levels (addressable with six bits) may be applied, in order to vary the amount of toner particles deposited per toner station. Usually, only sixteen levels from these 64 levels are selected in order to achieve density levels which are discernible from each other.

Since the toners had a $d_{v50}$ of 8 $\mu$m, the number N of different types of toner was chosen to be 3.

In a first printing experiment, the 600 dpi microdots were grouped 2 by 2 in adjacent halftone cells, in order to have a higher grey-scale resolution per toner printing station at a 300 dpi resolution than the 64 levels at 600 dpi. A table was built with three amounts of toners—indicated by $C^1$, $C^2$ and $C^3$ in FIG. 9, where $C^1$ stand for the amount of toner A, $C^2$ for the amount of toner B and $C^3$ for the amount of toner C—and four microdots: microdot 1, microdot 2, microdot 3 and microdot 4. The microdots were geometrically arranged as shown in FIG. 9: microdot 1 top left in the cell, microdot 3 top right in the cell, microdot 4 bottom left and microdot 2 bottom right. As the density $D_0$ increased, the toner concentrations $C^1$, $C^2$ and $C^3$ were varied according to the graphs in FIG. 9. For the lowest density values, the concentration of the first toner for microdot 1 was increased from zero to maximum. In order to achieve higher density levels $D_0$, the concentration of the first toner for microdot 2 increases from zero to maximum. The same happens for microdots 3 and 4 respectively. Once the four microdots got the maximum toner concentration of the first toner, the concentration of the second toner is increased from zero to maximum, first for microdot 1, then 2, 3 and 4 respectively. Once the four microdots of the cell are covered by maximum amounts of toner A and tones B, then the concentration of toner C in increased for microdot 1, 2, 3 and 4 respectively from minimum to maximum concentration in order to achieve a higher density on the substrate.

A wedge consisting of patches of 1 cm$^2$ of following 19 input levels $X_i$ was printed: 0, 42, 84, 126, . . . 714, 756. These input levels correspond with the figures in abscissa $D_0$, multiplied with 63. E.g. 12*63=756. After printing, the reflectance densities $Y_i$ were measured and represented in a graph. The desired overall tone behaviour may be obtained by executing a procedure like the one represented below, including the following steps:

expressing the $Y_i$ in the appropriate space (e.g. Opacity, Density or Lightness);

fitting a continuous representation to the inverted couples $Y_i$,$X_i$;

sampling that continuous representation equidistantly at the desired number of input levels.

In this manner, 256 levels equidistant in Opacity were selected out of the 757 input-levels from FIG. 9. A medical image digitized at eight bits and with resolution of 300 dpi was printed.

An advantage of this method is that the opaque reflecting substrate is always covered by a full layer of toner A (first toner with concentration $C^1$), before any toner of toner composition B (second toner) of higher pigmentation is deposited, such that intentional modulation and noise associated with the tone layer B is reduced in amplitude to the difference in opacity of layer A and the combined layers A+B. Similarly, fluctuations due to toner C have an amplitude limited to the difference in opacity of layer A+B and layer A+B+C. A disadvantage is the significant toner consumption: three full layers of toner are deposited to achieve maximum density.

In order to assess the print quality, the "perceived" standard deviation of a substantially constant density was measured. Patches with microdots having maximum toner concentration were produced. The printing was done on paper and the density patches were measured in reflection mode. In a first test, a visual density of 1.45 was produced by making use of one toner. In a second test, the same visual density was obtained by using three types of achromatic toners in overprinting, according to the method of the current invention. For both the first and second test, the homogeneity of the patches was measured.

The homogeneity of a patch of even densities was expressed with respect to the visibility of density differences, i.e. to the way a human observer would perceive these differences. Therefore, the measured values of density variations (in fact a well known $\sigma_D$) were recalculated to density variations as perceived by a human observer. In practice, a sample of even density patches printed on paper was scanned in the direction of the movement of the receiving substrate with a slit of 2 mm by 27 $\mu$m and a spatial resolution of 10 $\mu$m. The sampling distance was 1 cm and 1024 data points were sampled. The sampling proceeded in reflection mode and the reflectances where measured.

The obtained scan of the reflectances was converted to a "perceived" image by means of a perception model. This conversion comprises the following steps:

(i) applying visual filtering, describing the spatial frequency characteristics of the "early" eye, i.e. only taking in account the receiving characteristics of the eye. The filter used, was the one as described in detail by J. Sullivan et al. in IEEE Transactions on Systems, Man and Cybernetics, vol. 21, n° 1 p. 33 to 38, 1991. Contrary to the filter described in said reference, the filter was not levelled off to a value of one for frequencies lower than the frequency of maximum sensitivity of said early eye. This means that in measurement, a band-pass filter was used, instead of a low-pass filter in the reference cited above. The viewing distance was 25 cm.

(ii) transforming the reflectances (R), that have been transformed in step (i) by the filtering, to visual densities ($D_{vis}$), by following formulae:

$D_{vis}=2.55\times(1-R^{1/3})$ when the reflectance (R) is higher than or equal to 0.01, and $D_{vis}=2.00$ when the reflectance (R) is lower than 0.01, while the eye can differentiate reflectances below 0.01.

In the thus obtained "perceived" image the standard deviation of the density fluctuation ($\sigma_D$) was calculated.

A value for the parameter $\sigma_D$ smaller than 0.045 means acceptable image quality, in terms of homogeneity of even density patterns, a value smaller than 0.030 means excellent quality, a value of 0.025 to 0.020 is typical for offset high-quality. The results of this analysis was 0.030 for the first test, using one single toner type and the result was 0.020 for the second test, using three toner types having substantially the same chromaticity. From these results it is clear that the noise level is substantially lower if more toner types are used.

The same tests were done for patches which were obtained by multilevel halftoning techniques, in order to achieve visual densities between 0.6 and 1.2. In all these cases, the results when using several toner types were better than 0.025, while the results when using one single toner type were above 0.030.

In a second printing experiment, wherein the toner consumption could be reduced by approximately 33%, while keeping the desired noise reduction effect and the stabilization of highlight rendition described above to a large extent, is based on the scheme of the second experiment with the Agfa Chromapress system.

Three of the five 600 dpi six bit toner printing stations of the recto side of an Agfa Chromapress were filled with three two-component developers, where the carbon pigmentation was the same as in the first experiment, leading to the same measured reflectance densities when the logical full density exposure for each of the toner printing stations was selected.

Again, the 600 dpi microdots were grouped in halftone cells in a 2 by 2 fashion, in order to get a higher grey-scale resolution per toner printing station at a 300 dpi resolution than the 64 levels at 600 dpi. A concentration scheme was built with three toners and four microdots, using 63 entry levels, per microdot and per printing station, as depicted in FIG. 10. The microdots were numbered according to the geometry in FIG. 10. The numbers in abscissa (0 to 12) may be multiplied by 63 in order to get input-levels from 0 to 756. Note that the microdot arrangement in the cell is chosen such that toners A ($C^1$) and C ($C^3$) form horizontal lines when two out of the four pixels are on, while toner B ($C^2$) forms vertical lines when two out of the four microdots are on. This is advantageous to minimise the sensitivity to wrong registration and banding, induced by vibration. This may be understood by the assumption that intersecting perpendicular lines do not change their mutual overlap when one set of lines is shifted with respect to the other.

A wedge consisting of patches of 1 $cm^2$ of the next 19 input levels $X_i$ was printed: 0, 42, 84, 126, . . . 714, 756 and the measured reflectance densities $Y_i$ were represented in a graph. Using the method as set out under the first example, 256 equidistant levels with respect to opacity-were selected out of the 757 from FIG. 10. Again a medical image was printed, the image being represented by 256 density levels and having a resolution of 300 dpi. Again, noise levels were substantially reduced.

Having described in detail preferred embodiments of the current invention, it will now be apparent to those skilled in the art that numerous modifications can be made therein without departing from the scope of the invention as defined in the following claims.

We claim:

1. A method for reproducing a continuous tone image by image wise application of toner particles to a substrate comprising the following steps:

partitioning a surface of said substrate into a plurality of disjunctive microdots;

applying to at least one microdot at least two types of toner, having substantially the same chromaticity.

2. Method according to claim 1, further comprising the steps of:

establishing a region of adjacent microdots, comprising said at least one microdot;

applying to at least one microdot within said region a high amount of one of said at least two types of toner;

applying to at least one other microdot within said region a low amount of said one toner; and, applying to at least one other microdot within said region a medium amount of said one toner.

3. Method according to claim 2, wherein for each of said at least two types of toner a minority of microdots within said region is supplied with a medium amount of toner.

4. Method according to claim 1, wherein each microdot, supplied with a plurality of toner types having substantially the same chromaticity, is supplied with a high amount of at least one toner type having said chromaticity.

5. Method according to claim 2, wherein at least one region—comprising at least one microdot supplied with a plurality of toner types, having substantially the same chromaticity—is completely supplied with a high amount of at least one toner type.

6. Method according to claim 1, wherein microdots are printed by applying a number (N) of types of toner particles having substantially the same chromaticity, said toner particles of one type having a largest average volume diameter $d_{v50}$, and wherein said number N fulfils the relation $N \geqq 0.3 \times d_{v50}$ and wherein N is determined by adding 0.5 to $0.3 \times d_{v50}$ and rounding to the next lower integer.

7. Method according to claim 1, wherein microdots are printed by applying a number (N) of types of toner particles, having substantially the same chromaticity, said toner particles of one type having a largest average volume diameter $d_{v50}$ and wherein said number N fulfils the relation $N \geqq 0.4 \times d_{v50}$ and wherein N is determined by adding 0.5 to $0.4 \times d_{v50}$ and rounding to the next lower integer.

8. Method according to claim 1, wherein in a finished image maximally 2 mg of toner is present per $cm^2$.

9. Method according to claim 1, wherein said types of toner particles differ in degree of colouring power, toner particles $T_1$ having the lowest degree of colouring power, toner particles $T_{max}$ having the highest colouring power.

10. Method according to claim 1, wherein said types of toner particles have a different volume average diameter $d_{v50}$.

11. Method according to claim 9, wherein said colouring power of toner particles ($T_1$) is such that depositing an amount of $T_1$ gives between 10 and 50% of the density given by depositing an equal amount of toner particles ($T_{max}$).

12. Method according to claim 9, wherein said toner particles $T_1$ have an average volume diameter $d_{v50}$ between 5 and 20% lower than said toner particles $T_{max}$.

13. Method according to claim 1, wherein the printing proceeds on a transparent final substrate and at least one of said types of toner particles comprises one or more ingredients that together or in cooperation with ingredients comprised in said final substrate are capable of forming a light absorbing substance and said toner particles optionally comprise a light absorbing pigment or dye.

14. Method according to claim 1, wherein said toner particles are dry toner particles.

15. Method according to claims 1, wherein said image reproduction process is an electrographic process.

16. Method according to claim 2, wherein said region is a multilevel halftone cell, comprising disjunctive sets of adjacent microdots.

17. Method according to claim 1, wherein said continuous tone image is a medical image.

18. Method according to claim 17, wherein a transparent support is used and said support is a blue-polyester support.

* * * * *

UNITED STATES PATENT AND TRADEMARK OFFICE
CERTIFICATE OF CORRECTION

PATENT NO. : 5,825,504

DATED : October 20, 1998

INVENTOR(S) : Broddin et al.

It is certified that error appears in the above-identified patent and that said Letters Patent is hereby corrected as shown below:

Column 3, line 53, "with:" should read -- with --;

Column 3, line 54, "wherein" should read -- wherein: --;

Column 16, line 43, "opacity-were" should read -- opacity were --;

Column 18, line 32, "blue-polyester" should read -- blue polyester --.

Signed and Sealed this

Sixteenth Day of May, 2000

Attest:

Q. TODD DICKINSON

*Attesting Officer* *Director of Patents and Trademarks*